US010110553B2

United States Patent
Grundemann et al.

(10) Patent No.: US 10,110,553 B2
(45) Date of Patent: Oct. 23, 2018

(54) ADAPTIVE PREFIX DELEGATION

(71) Applicant: Cable Television Laboratories, Inc., Louisville, CO (US)

(72) Inventors: Christopher Grundemann, Denver, CO (US); Christopher J. Donley, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1161 days.

(21) Appl. No.: 13/783,242

(22) Filed: Mar. 2, 2013

(65) Prior Publication Data

US 2014/0108673 A1    Apr. 17, 2014

Related U.S. Application Data

(60) Provisional application No. 61/712,318, filed on Oct. 11, 2012, provisional application No. 61/771,807, filed on Mar. 2, 2013.

(51) Int. Cl.
  *H04L 29/12* (2006.01)
  *H04L 12/24* (2006.01)
  *H04L 29/06* (2006.01)

(52) U.S. Cl.
  CPC ......... *H04L 61/2015* (2013.01); *H04L 41/08* (2013.01); *H04L 63/02* (2013.01)

(58) Field of Classification Search
  CPC .................... H04L 61/2015; H04L 63/02
  See application file for complete search history.

(56) References Cited

U.S. PATENT DOCUMENTS

| 8,116,378 | B2 | 2/2012 | Zhu | |
| 8,681,695 | B1* | 3/2014 | Krishnan | 370/328 |
| 2006/0159086 | A1* | 7/2006 | Bras | H04L 29/06 370/389 |
| 2011/0228734 | A1 | 9/2011 | Laganier | |
| 2011/0292879 | A1* | 12/2011 | Wang | 370/328 |
| 2012/0314617 | A1* | 12/2012 | Erichsen et al. | 370/254 |
| 2012/0314705 | A1* | 12/2012 | Howard | 370/390 |

FOREIGN PATENT DOCUMENTS

JP    2005-340983    12/2005

OTHER PUBLICATIONS

Hinden et. al., IP Version 6 Addressing Architecture, RFC 4291 (Feb. 2006).*
Singh et al. "Basic Requirements for IPv6 Customer Edge Routers". draft-ietf-v6ops-6204bis-11. Sep. 26, 2012. pp. 1-22.*
ripe.net. "Understanding IP Addressing and CIDR Charts". Sep. 30, 2016. pp. 1-4.*
mathisfun.com. "Binary Number System". Feb. 2007. pp. 1-3.*
Huston. "Considerations on the IPv6 Host Density Metric". RFC 4692. Oct. 2006. pp. 1-17.*
International Search Report and Written Opinion for corresponding PCT Application No. PCT/US2013/048833, dated Sep. 4, 2013, 11 pages.

* cited by examiner

*Primary Examiner* — John M MacIlwinen
(74) *Attorney, Agent, or Firm* — Great Lakes Intellectual Property, PLLC.

(57) ABSTRACT

Adaptive prefix delegation that facilitates delegating prefixes from one device to another. The prefix delegation may be adaptively implemented to enable delegation router to make decision regarding characteristics of prefixes to be delegated. The adaptive prefix delegation may be automatically or dynamically preformed according to particularly operation capabilities of each delegating device.

14 Claims, 5 Drawing Sheets

ADAPTIVE PREFIX DELEGATION

CROSS-REFERENCE TO RELATED APPLICATIONS

This application claims the benefit of U.S. provisional Application No. 61/712,318 filed Oct. 11, 2012, and U.S. provisional Application No. 61/771,807 filed Mar. 2, 2013 the disclosures of which are incorporated in their entirety by reference herein.

TECHNICAL FIELD

The present invention relates to prefix delegation, such as but not necessarily limited to delegation of Internet Protocol version 6 (IPv6) prefixes using Dynamic Host Configuration Protocol version 6 (DHCPv6).

BACKGROUND

Dynamic Host Configuration Protocol (DHCP), such as that described in Internet Engineering Task Force (IETF) request for comment (RFC) 2131, 3315 and 3633, the disclosures of which are hereby incorporated by reference in their entirety, relate to mechanisms for automating delegation of IPv4 and/or IPv6 prefixes from a delegating router (DHCP server) to a requesting router (DHCP client). The delegating router may be associated with a service provider or other service providing entity tasked with facilitating Internet or other network-based messaging between an outside network, such as but not necessary limited to the Internet, and an inside network, such as but not necessary limited to a local or home network. The service provider may be allocated or otherwise assigned a plurality of IPv6 addresses or other domain of addresses from which individual addresses may be allocated for use by devices connected to the inside network. The service provider may be configured to facilitate messaging between the outside network and any number of inside networks using the allocated addresses.

To ensure devices connected to each inside network receive unique IPv6 addresses, the service provider may sub-delegate certain prefixes to customer edge routers (CERs), edge routers (ERs) or other requesting routers responsible for interfacing signaling between the outside network and the inside network. The prefixes may define separate addressing ranges to ensure unique addresses are available for use over each of the inside networks corresponding with each device receiving a prefix. The service provider may sub-delegate the particular prefixes to the requesting routers of each inside network in a process commonly referred to as prefix delegation. Once the prefixes are delegated to each inside network, the requesting router (ER) of each inside network may then be responsible for additionally sub-delegating the prefixes to internal routers (IRs) or other devices necessary to facilitate communications between customer premise equipment (CPE) or other connected devices and the ER or another upstream IR.

The ERs and IRs may perform prefix sub-delegation in a manner similar to that described above to facilitate delegating the prefixes received from an upstream router to one or more downstream routers (IRs). The delegation process may correspond with an upstream router acting as a delegating router and one or more downstream routers acting as requesting routers where the delegation-requesting relationship repeats for each layer of routers. In this manner, after the one or more prefixes are delegated to an inside network, the ER of the inside network may be required to further sub-delegate that prefix to additional IRs which, in turn, may be required to yet further sub-delegate received prefixes to additional IRs. Accordingly, regardless of whether the prefix is being delegated from the service provider of an outside network to an ER of an inside network, or from an ER of an inside network to an IR of the inside network, multiple prefix delegations may occur. The present invention contemplates a need to facilitate unmanaged or self-configuration where the process of delegating and sub-delegating prefixes may be automated or otherwise dynamically performed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
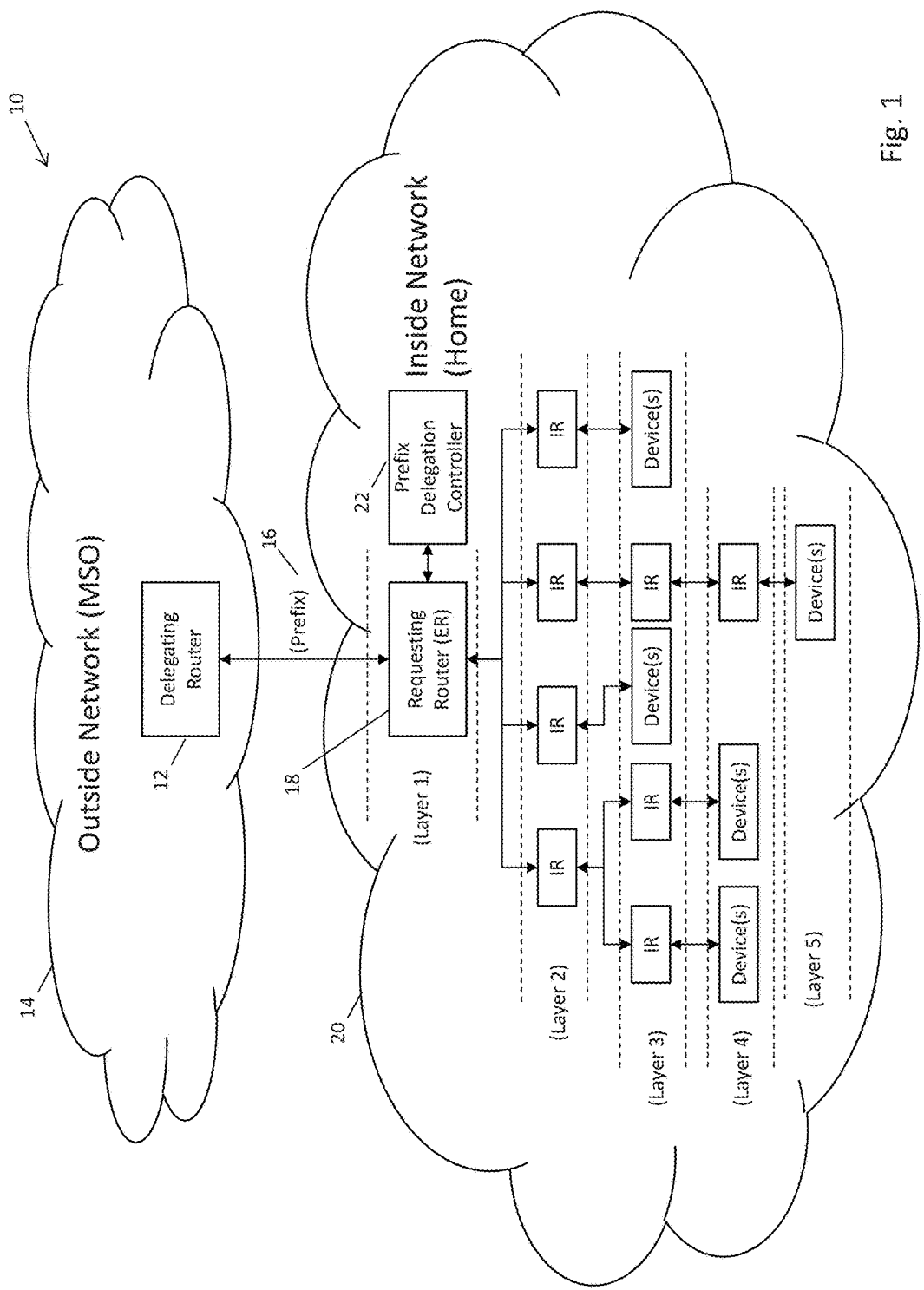
FIG. 1 illustrates an adaptive prefix delegation system in accordance with one non-limiting aspect of the present invention.

FIG. 1 illustrates an adaptive prefix delegation system 10 in accordance with one non-limiting aspect of the present invention. The system 10 illustrates one exemplary configuration where a delegating router 12 associated with an outside network 14 provides a prefix 16 (first prefix) to a requesting router 18 for delegation within an inside network 20. The prefix 16 may be any suitable addressing prefix, such as but not necessarily limited to an Internet Protocol version 6 (IPv6) prefix and an Internet Protocol version 4 (IPv4) prefix. The present invention is predominately described with respect to delegating IPv6 prefixes without necessarily intending to limit the scope of the present invention as the delegation of other types of prefixes is contemplated. Dynamic Host Configuration Protocol (DHCP), such as that described in Internet Engineering Task Force (IETF) request for comment (RFC) 2131, 3315 and 3633, or other suitable delegation processes may be employed to facilitate delegating the first prefix to the requesting router 18. The requesting router 18 may be configured to facilitate adaptively delegating the first prefix 16 to additional routers associated with the inside network 20. The adaptive delegation may be useful in facilitating unmanaged or self-configuration where the process of delegating and sub-delegating prefixes may be automated or otherwise dynamically performed.

The outside network 14 and the inside network 20 are illustrated to demonstrated one exemplary, non-limiting use of the present invention where a multiple system operator (MSO), Internet service provider (ISP) or other type of service provider is allocated a prefix or addressing domain by a suitable addressing entity to facilitate Internet-based messaging or other network-based messaging. The first prefix 16 delegated from the delegating router 12 need not necessarily be associated with the outside network 14 or any other particular network and may be provided to the requesting router 18 directly from the addressing entity. The inside network 20 is shown to be distinguished from the outside network 14 to demonstrated one use case where an MSO may be tasked with facilitating messaging for a plurality of inside networks, such as but not necessarily limited to home networks or other internal networks associated with its subscribers. While only one inside network 20 is illustrated, the delegating router 12 and/or the MSO may be responsible for facilitating prefix delegation with any number of inside networks or other downstream connected networks. The self-configuration capabilities contemplated by the present invention may be useful in allowing the MSO to delegate one or more prefixes 16 to each of the supported inside networks 20. The inside networks 20 may then adaptively delegate the received prefix(es) 16 to other downstream devices in a manner that ameliorates prefix delegation related responsibilities of the MSO.

A prefix delegation controller 22 may be included to facilitate the contemplated adaptive prefix delegation process of the present invention. The prefix delegation controller 22 is shown to be separate from the requesting router 18 for exemplary non-limiting purposes in order to highlight its use within the system 10. The prefix delegation controller 22 may be a computer program product, application or software operable with the requesting router 18, which may be periodically referred to herein as a customer edge router (CER) or edge router (ER) and/or other downstream connected routers, which may be periodically referred to herein as internal routers (IRs). The prefix delegation controller 22 may be downloaded, embedded or otherwise provided to each of the home network routers (ER, IRs, etc.). The prefix delegation controller 22 need not necessarily be a separate controller added to the home network routers and instead may be a default, an extension or other programmable setting capable of being integrated with an operating system of the home network routers or other routers configured in accordance with the present invention to facilitate adaptive prefix delegation. The prefix delegation controller 22 may be embodied in a computer-readable medium having non-transitory instructions, which may be operable with a processor or other logically executing feature, may facilitate the operations described herein.

The contemplated prefix delegation may correspond with the ER receiving the first prefix 16 from the delegating router 12 and thereafter sub-delegating the first prefix 16 to the IRs. The process of dividing the first prefix 16 into additional prefixes may be interchangeably referred to as sub-delegation and/or delegation in that the use of delegating and/or sub-delegating is not necessarily intended to incorporate a particular hierarchical relationship or other limiting organization between the delegating routers. While the present invention is predominately described with respect to facilitating delegation of prefixes between routers, the present invention fully contemplates facilitating prefix delegation between other types of devices and is not necessarily limited to routers or devices having routers. The exemplary description of routers is provided to demonstrate one use of the present invention where the ER may be responsible for facilitating or initiating prefix delegation with a plurality of downstream connected IRs arranged in a layered architecture. A five layer architecture is shown to correspond with a first layer having the ER, a second layer having one or more IRs connected directly to the ER, a third layer having one or more IRs and/or devices connected to one of the second layer IRs, a fourth layer having one or more IRs and/or devices connected to one of the third layer IRs, and a fourth layer having one or more devices connected to one of the fourth layer IRs.

The IRs and/or devices are shown to be connected to a single upstream ER or IRs as such devices may be configured to listen to no more than one delegating router/device on a link (solid lines) in order to comply with DHCP requirements. The single-connection of each component is shown for exemplary non-limiting purposes as the present invention fully contemplates the inside network having any number of configurations and interconnections between the ER, IRs and/or devices. Optionally, the ER, IRs and/or devices may be configured to receive multiple prefixes, such as in the manner described in U.S. patent application Ser. No. 13/754,954, the disclosure of which is hereby incorporated by reference in its entirety. The process of delegating prefixes may require the ER and/IRs to be characterized, according to the nomenclature set forth in DHCP at different times, as acting as a delegating router and/or a requesting router depending on whether operating to request a prefix or to delegate a prefix. The capability of the present invention to facilitate prefix delegation between routers and/or other devices having capabilities to act as delegating and/or requesting routers may be beneficial in allowing the contemplated adaptive prefix delegation to be used in virtually any environment where it may be desirable to facilitate automated prefix delegation. Optionally, the present invention may be useful in environments which may not rely upon the described interaction between the outside network 14 and the inside network 20.

Figure 2:
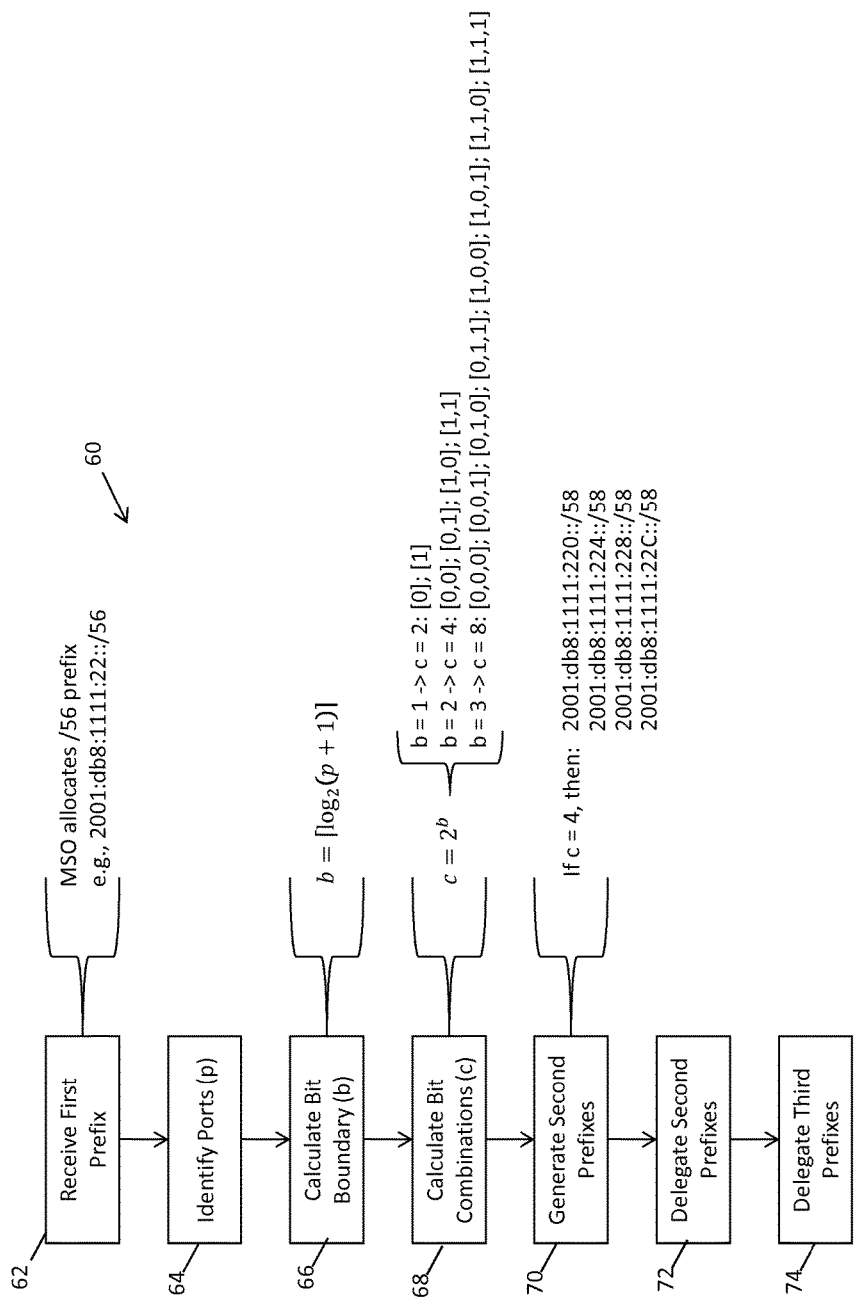
FIG. 2 illustrates a flowchart of a method for prefix delegation in accordance with one non-limiting aspect of the present invention.

FIG. 2 illustrates a flowchart 60 of a method for prefix delegation in accordance with one non-limiting aspect of the present invention. The method may be embodied in a computer-readable medium having non-transitory instructions sufficient to facilitate controlling, instructing or otherwise manipulating a router, device, phone, computer or other hardware-implement to facilitate the contemplated operations. The method for prefix delegation is predominately described with respect to the ER and IRs illustrated in FIG. 1 being configured to perform self-directed operations associated with the described processes. While the present invention contemplates the ER and IRs having such capabilities, i.e., being programmed to execute certain operations, the present invention fully contemplates the use of a standalone controller or other entity for otherwise achieving the prefix delegation related operations. The method is also predominately described with respect to a layered architecture where a network includes an ER and multiple IRs requiring a prefix initially provided to the ER to be delegated to one or more IRs and thereafter delegated as needed to lower layer IRs. The present invention, however, fully contemplates facilitating prefix delegation across multiple networks and/or between devices connected to different networks or otherwise unbound to a single inside network.

Block 62 relates to receiving a first prefix for subsequent delegation. The first prefix may be received with the ER for subsequent delegation throughout the inside network or being received with another device for subsequent delegation to other devise, which optionally may not be bound to a particular network. Without intending to limit the present invention, the method is described with respect to the ER receiving the first prefix from the delegating router and thereafter adaptively delegating the first prefix to the downstream connected IRs, which is turn may subsequently delegate received prefix(es) to further downstream connected IRs. The first prefix may corresponding with a prefix suitable to globally unique addressing (GUA), unique local addressing (ULA), Internet Protocol (IP) addressing (e.g., IPv4, IPv6) or other types of addressing related prefixes. The first prefix is assumed for exemplary non-limiting purposes to corresponding with an IPv6 prefix delegated to the ER according to DHCPv6, although the first prefix may be delegated according to other messaging protocols or manually input to the ER. The first prefix may be delegated to the ER in a IA_PD message, optionally along with a suitable IA_NA message, such as in the manner described in U.S. patent application Ser. No. 13/992,971, the disclosure of which is hereby incorporated by reference in its entirety.

Figure 3:
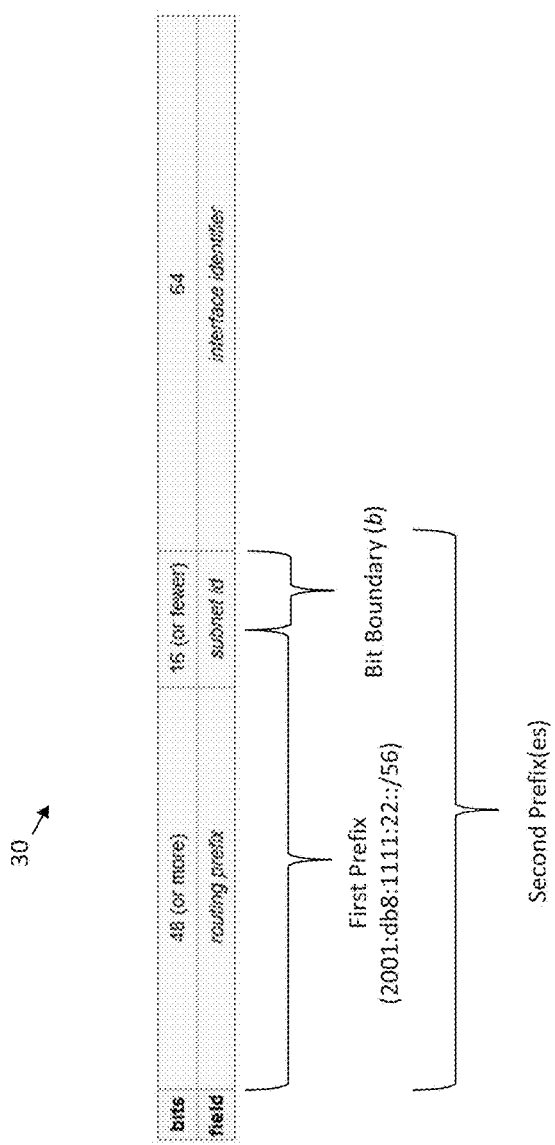
FIG. 3 schematically illustrates a formatting diagram in accordance with one non-limiting aspect of the present invention.

FIG. 3 schematically illustrates the first prefix relative to a formatting diagram 30 of a generic IPv6 address in accordance with one non-limiting aspect of the present invention. The formatting diagram includes a first row indicative of 128 bits comprising the IPv6 address and a second row indicative of associated IPv6 fields. A first field may be used to identify a routing prefix, a second field may be used to identify a subnet ID and a third field may be used as an interface identifier. The routing prefix may comprise 48 or more bits and the subnet ID may comprise 16 or less bits depending on the length of the routing prefix. The length of the routing prefix may be may be decided by the delegating router 12 according to delegation rules and/or otherwise specified according to network design/allocation parameters. The subnet ID may be similarly fashioned by the delegating router 12 and/or other entity depending on the length of the routing prefix and the need to provide addition addressing restrictions. The delegating router 12 or associated MSO may be provided a broader IPv6 prefix, such as a /48 prefix, and then delegate longer prefixes, such as a /52 or /56 prefix, to the requesting router(s) 18. The length of prefix requiring delegation may vary and is illustrated for exemplary non-limiting purposes to correspond with a /56 prefix.

The first prefix is shown to correspond with a /56 prefix having an address of 2001:db8:1111:22::/56. The illustrated /56 first prefix consumes the 48 bits of the routing prefix and eight bits of the subnet ID field, leaving eight bits for further subnet addressing. More or less bits would be available for the subnet ID field in the event the first prefix was longer or shorter than /56, e.g., 16 subnet bits would be available for a /48 prefix and 12 subnet bits would be available for a /52 prefix. The interface identifier field is shown to comprise 64 bits and may be reserved to facilitate other addressing requirements as one skilled in the art will appreciate. The present invention contemplates capitalizing on the variability associated with the length of the subnet ID field to facilitate prefix delegation. This is shown to correspond with using one or more of the available subnet ID bits as a bit boundary. The bit boundary can be added in accordance with the present invention to the first prefix in order to generate one or more second prefixes. The bit boundary may correspond with the bits available within the subnet ID fields, i.e., the bits of the subnet ID field not already being consumed with the first prefix. The bit boundary may comprise up to eight bits for a /56 first prefix, 12 bits for a /52 first prefix and 16 bits for a /48 prefix. The bits made available to the bit boundary may be individually selectable 0s and 1s to provide a plurality of bit combinations.

Returning back to FIG. 2, Block 64 relates to identifying a number of ports or interfaces available at the ER for further delegation of the first prefix. The number of ports/interfaces, or other ER parameters, may be used to represent capabilities of the ER to facilitate signaling with downstream connected devices/routers. The ER illustrated in FIG. 1 is shown to communicate with four IRs of layer 2, meaning the ER employs at least one independent interface for each of the layer 2 IRs. The ER may be configured with additional interfaces to facilitate link creation with additional devices/IRs. The number of links that the ER may be able to support may be proportional to the number of available ER interfaces such that the capability of the ER to facilitate delegating prefixes to other downstream connected IRs may be constrained by the number of available interfaces. Of course, the present invention is not necessarily so limited and fully contemplates the ER having capabilities to support multiple downstream connected IRs using the same interface/link and/or delegating prefixes to IRs that may not be directly connected. The exemplary illustration set forth herein presumes the ER is responsible for routing messaging between the IRs and devices such that separate interfaces are employed for each directly connected IRs.

Block 66 relates to calculating a bit boundary to be used in facilitating delegation of the first prefix over the inside network 20. The bit boundary may be calculated to be proportional to the number of ports/interfaces identified to be available at the ER to facilitate communications with directly connected IRs. The bit boundary calculation may be adaptively or dynamically determined according to the particular configuration of the ER such that ERs having more interfaces may be provided a greater bit boundary than ERs having fewer interfaces. In this manner, the bit boundary for each router delegating a prefix may be uniquely and independently determined according to the particular operating constraints of that router. One non-limiting aspect of the present invention contemplates an algorithm executing at the ER or other delegating router calculating a bit boundary value b to represent the bit boundary. The algorithm may be used to facilitate assessing a number of addressing variations needed for the first prefix in order to generate a sufficient number of second prefixes to support the interfacing capabilities of the ER. The algorithm, for example, may be selected to ensure the ER divides the first prefix such that at least one second prefix is generated for each available interface.

One contemplated algorithm calculates the bit boundary according to the following equation:

$$b = \lceil \log_2(p+1) \rceil$$

where b corresponds with a whole number representing the bit boundary and p corresponds with the number of available ports/interfaces. This equation may be beneficial in providing an arithmetic method for calculating the bit value b.

Block 68 relates to calculating bit combinations coinciding with the value associated with b. The bit boundary value b may be used to represent the number of bits available within the subnet ID field to be used in facilitating delegation of the first prefix. The number of bits (e.g., 1, 2, 3, etc.) may each correspond with binary values such that certain bit combinations of 0s and 1s are possible depending on the number of bits comprising the bit boundary. The number of bit combinations may be determined according to the following equation:

$$c = 2^b$$

where c is the quantity of possible combinations and b is the whole number determined according to the above-identified bit boundary formula. FIG. 2 illustrates bit boundary combinations associated with b values of 1, 2 and 3, which respectively corresponding with two bit combinations, four bit combination and eight bit combinations.

Block 70 relates to generating the one or more second prefixes based on the bit combinations. The generation of prefixes based on the bit combinations, and thereby the bit boundary, may be used to relate the quantity of generated prefixes to the quantity of available interfaces/ports. The prefix generation process may be performed independently and autonomously at each delegating router to enable dynamical network configuration and addressing, which may be particularly beneficial in enabling each router to proportionate prefix generation according to their particular capabilities. The second prefixes may be generated by appending, adding or otherwise associating one or more of the bit combinations with the first prefix. The resulting second prefixes may then correspond with the first prefix plus a different one of the bit combinations.

Figure 4:
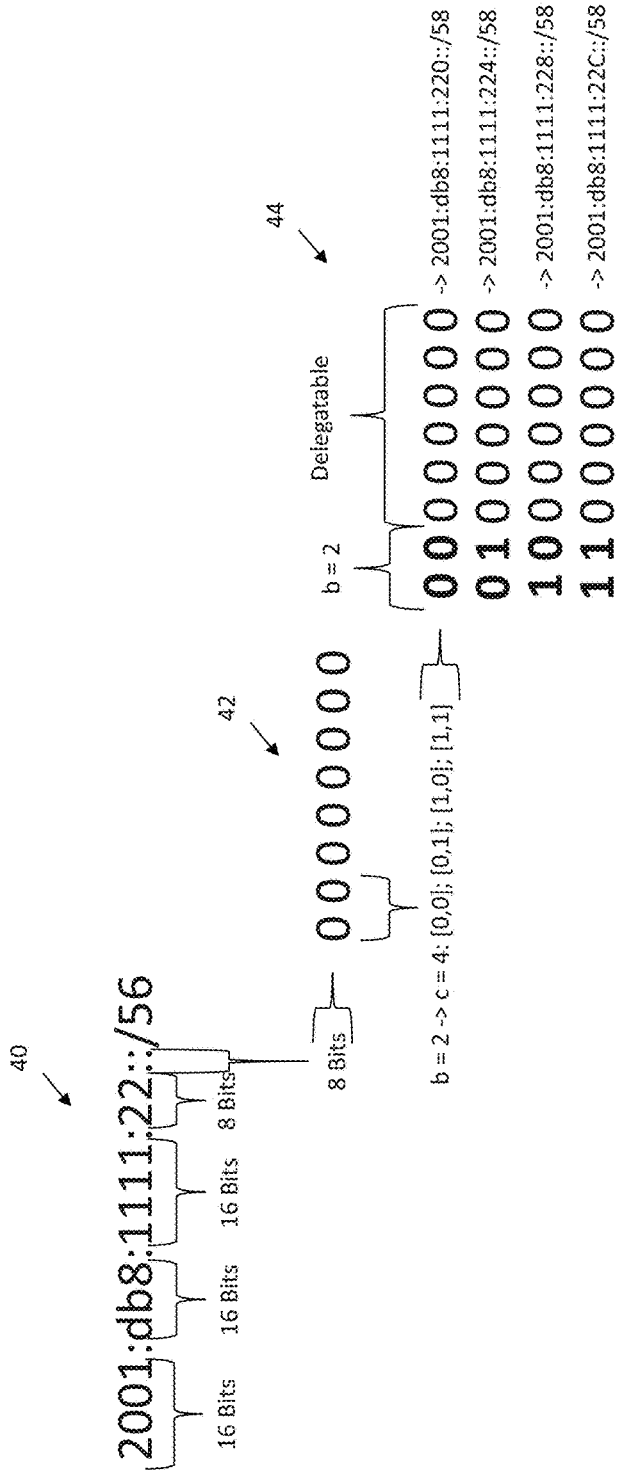
FIG. 4 schematically illustrates generation of the second prefixes in accordance with one non-limiting aspect of the present invention.

FIG. 4 schematically illustrates generation of the second prefixes in accordance with one non-limiting aspect of the present invention. A first stage 40 of a generation process may correspond with identifying the first prefix and the number of bits available within the corresponding subnet ID field for further use in delegation, which is shown for exemplary non-limiting purposes to correspond with 8 bits. A second stage 42 may correspond with identifying bits to be added to the first prefix in order to generate the one or more second prefixes. The second stage is shown to correspond with a bit value b equaling 2 such that the first two bits of the subnet ID following the first prefix are used to generate the second prefixes. A third stage 44 is shown to correspond with generating the quantity of second prefixes to match the quantity of bit combinations, which is shown to correspond with four bit combinations. The third stage 44 is shown to represent the binary form of the values added to the first prefix and the resulting hexadecimal representation of the second prefixes. Additional binary values (delegatable) may be added to form additional prefixes.

Block 72 relates to delegating the one or more second prefixes to the next layer (e.g. layer 2 IRs). The ER may delegate the second prefixes according to DHCP or another delegation protocol. Optionally, the ER may keep one or the second prefixes for its own use such that the number of second prefixes made available for delegation corresponds with the number of bit combinations less one. The ER may retain the lowest prefix, i.e., the prefix corresponding with the binary combination of all 0s, for its own use and delegate the remaining prefixes for use with the lower layer IRs. The lower layer IRs may then use a received one of the second prefixes for further delegation, such as according to the processed described above where the lower layer IRs may repeat the process by substituting the received one of the second prefixes for the first prefix.

Block 74 relates to delegating one or more third prefixes. The one or more third prefixes may be delegated from the second layer IRs to third layer IRs based on the received one of the second prefixes delegated thereto. Each second layer IRs receiving one of the second prefixes may be perform operations similar to that described above with respect to the ER to facilitate further prefix delegation. The second layer originating delegations may be differ from the first layer delegations of the ER in that that the received one of the second prefixes is used instead of the first prefix and in that the bit boundary determined for the second layer IRs is instead added to the received second prefix when generating the one or more third prefixes. The lower layer IRs receiving one of the third prefixes may repeat a similar process for the next lower layer of IRs. The delegation process may repeat in this manner until each layer of IRs are delegated a prefix. Each lower layer delegation may add additional bit boundaries to the preceding layer prefix until the maximum prefix length of /64 is reached. The number of prefixes generated by each IRs below the ER may be constrained according the available interfaces such that each IRs adaptively determines the number of prefixes it can make available for the next layer.

The capability of the present invention to facilitate multiple-layer prefix delegation may be beneficial in unmanaged or automated networks where IRs may be freely added and removed from the network as it allows prefixes to be automatically generated without requiring network administrator to individual calculate the delegated prefixes. The contemplated prefix delegation may also be beneficial in that it allows each delegating router to individually assess its delegation capabilities to ensure enough prefixes are generated so that the delegating router can use each of its available interfaces. The adaptive prefix delegation can be used to facilitate mapping network addressing for virtually any size network or hierarchical grouping of routers. The extent of the adaptive prefix delegation may be constrained according to the prefix length limitations of the addressing protocol, e.g., the constraint of the IPv6 addressing limiting prefixes to the first 64 bits. The hierarchy or relationship between routers, i.e., the number of layers and/or the width of each layer, may be constrained according to the amount by which each first prefix can be sub-delegated and the interfaces available to each router.

Figure 5:
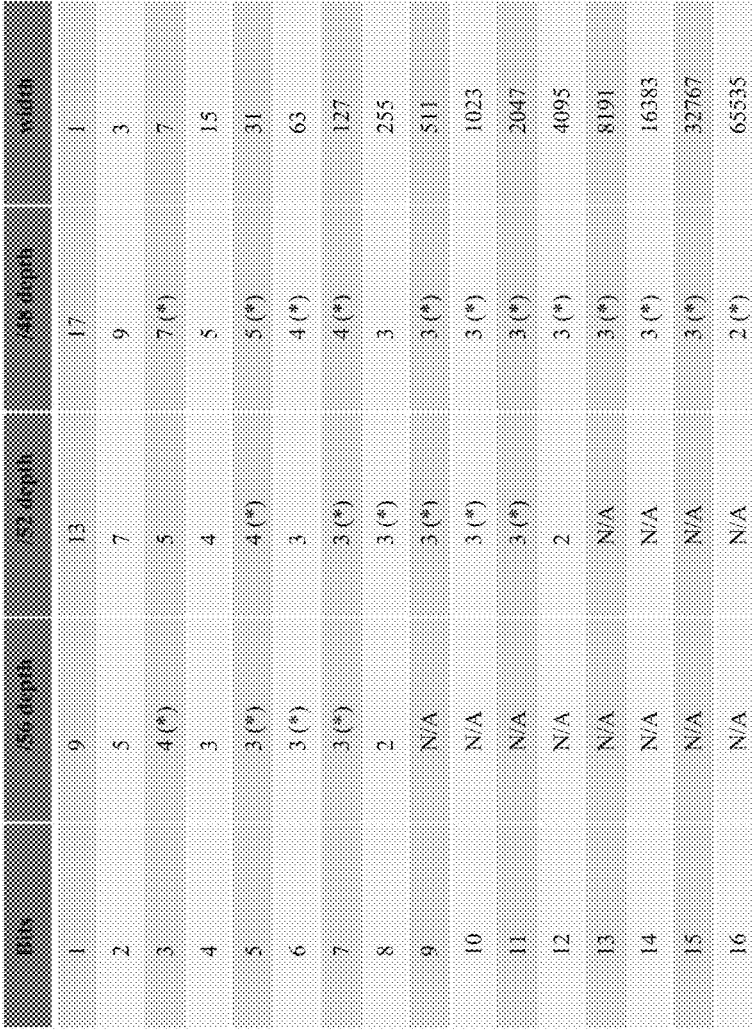
FIG. 5 illustrates a prefix table in accordance with one non-limiting aspect of the present invention.

FIG. 5 illustrates a prefix table 46 in accordance with one non-limiting aspect of the present invention. The prefix table relates to the bit boundary (illustrated as Bits) to a network depth and a layer width where different network depths are shown based on corresponding first prefix lengths of /56, /52 and /48. The layer width represents the number of prefixes that a delegating router can delegate to directly connected routers based on the corresponding bit boundary. (It is presumed that the delegating router maintains at least one prefix.) The network depth represents the number of layers that a prefix can be sub-delegated to before each successive prefix sub-delegation results in a maximum prefix length. An (*) is noted to represent situations in which the prefix delegated to a lowest layer router will be narrower than the preceding layer.

As supported above, one non-limiting aspect of the present invention contemplates a method for home routers to determine the size of prefix they sub-delegate within a home network based on their number of ports. When a self-configuring home network relies on DHCPv6 Prefix Delegation (PD), the present invention contemplates automating a decision made regarding how to break up the assigned prefix for sub-delegation. This decision may be made based on the number of ports/interfaces available on a given home router.

As illustrated in FIG. 4, regardless of the prefix size allocated to a home network, the "width" of that network may be determined by the number of bits used for sub-delegation. In this context width refers to the number of routers that any router can have directly connected downstream of it (i.e. how many prefixes it has available to sub-delegate to directly attached downstream routers). Since the number of directly attached downstream routers is typically limited by the number of ports available, the present invention contemplates subnetting on the bit-boundary that allows a width greater than or equal to the number of LAN ports available on a particular router. The rule can be summarized in the equation b=⌈log$_2$ (p+1)⌉ where 'p' is the number of LAN ports and 'b' is the appropriate number of bits to subnet with. For example, a router with 4 LAN ports: b=⌈log$_2$ (4+1)⌉=⌈log$_2$(5)⌉=⌈2.322⌉=3. Accordingly, a router with 4 LAN ports would choose to sub-delegate on 3-bit boundaries while a larger, 8-LAN-port device would select a 4-bit-boundary.

In order to facilitate prefix delegation when auto-configuring a home network, the home routers may be configured in accordance with the present invention to decide how to sub-delegate prefixes assigned to them. One non-limiting aspect of the present invention contemplates facilitating this decision using a default setting or other operational constraint of the delegating router to facilitate use algorithmic processes, dependent on physical properties of the router. With this invention, each router's default choice may be to ensure that it can service the maximum number of downstream routers without unnecessarily limiting the network topology.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiment may be combined to from further embodiments of the invention.

What is claimed is:

1. A non-transitory computer-readable medium having a plurality of non-transitory instructions stored thereon which when executed with a processor are sufficient for controlling a router to facilitate prefix delegation, the non-transitory instructions being sufficient for:
processing a message received from a delegating router to recover a first prefix represented therein as a plurality of bits;
determining from information kept at a storage location or a configuration file of the router a first number representing a quantity of interfaces available for use in sub-delegating the first prefix from the router to one or more downstream connected devices;
generating a bit boundary as a function of the first number;
representing the bit boundary as a whole number b;
calculating a binary combination for the whole number b, the binary combination representing each possible binary combination of 0s and 1s for a quantity of binary bits equaling the whole number b;
appending each of the binary combinations to the plurality of bits of the first prefix to generate a plurality of second prefixes, each of the plurality of second prefixes including the first plurality of bits plus one of the possible binary bit combinations of 0s and 1s; and
storing the plurality of second prefixes at the storage location or elsewhere on the router for subsequent retrieval, thereby self-configuring the router to create the plurality of second prefixes from the first prefix in an automated manner.

2. The non-transitory computer-readable medium of claim 1 wherein the non-transitory instructions are sufficient for generating the second prefixes such that each second prefix is a unique Internet Protocol (IP) version 6(IPv6) prefix.

3. The non-transitory computer-readable medium of claim 1 wherein the non-transitory instructions are sufficient for:
receiving the first prefix as an IPv6 prefix; and
generating the second prefixes such that each second prefix includes the IPv6 prefix plus one of the binary combinations.

4. The non-transitory computer-readable medium of claim 1 wherein the non-transitory instructions are sufficient for generating the whole number b according to the following equation:

$$b=\lceil \log_2(p+1) \rceil$$

wherein p =the first number.

5. The non-transitory computer-readable medium of claim 1 wherein the non-transitory instructions are sufficient for transmitting delegation messages from the router for delegating one or more of the second prefixes from the router to one or more of downstream connected devices, including instructions sufficient for retrieving the one or more of the second prefixes from the storage location or elsewhere on the router to facilitate generating the delegation messages.

6. The non-transitory computer-readable medium of claim 5 wherein the non-transitory instructions are sufficient for retaining one of the second prefixes from being delegated to the downstream connected devices.

7. The non-transitory computer-readable medium of claim 1 further comprising delegating one or more of the second prefixes to the downstream connected devices such that each receives one or more of the delegated second prefixes through a different one of the interfaces.

8. The non-transitory computer-readable medium of claim 1 wherein the non-transitory instructions are sufficient for:
when b=1, generating:
i) the binary combinations to correspond with: [0] and [1]; and
ii) the second prefixes to correspond with: [the first prefix plus one additional bit of 0] and [the first prefix plus one additional bit of 1]; and
when b=2, generating:
i) the binary combinations to correspond with: [0,0]; [0,1]; [1,0]; [1,1]; and
ii) the second prefixes to correspond with: [the first prefix plus two additional bits of 0,0]; [the first prefix plus two additional bits of 0,1]; [the first prefix plus two additional bits of 1, 0]; and [the first prefix plus two additional bits of 1,1].

9. A non-transitory computer-readable medium having a plurality of non-transitory instructions stored thereon which when executed with a processor are sufficient for controlling a router to facilitate delegating Internet Protocol (IP) version 6 (IPv6) prefixes, the non-transitory instructions being sufficient for:
receiving a first IPv6 prefix for delegation from a delegating router, the first IPv6 prefix being represented with a first plurality of bits;
determining a number of ports p available on the router for delegating the first IPv6 prefix;
generating a bit boundary number b as a function of p;
generating a binary bit number c as a function of b;
generating c binary bit combinations whereby each binary bit combination represents a unique combination of 0s and 1s different from each of the other binary bit combinations, the c binary bit combinations each being represented with an equal quantity of bits;

adding each of the c binary bit combinations to bit positions immediately following a last bit of the plurality of bits to generate c second IPv6 prefixes such that each second IPv6 prefix is different from each of the other second IPv6 prefixes and each second IPv6 prefix has a length equal to the plurality of bits plus the quantity of bits in each of the c binary bit combinations; and delegating one or more of the second IPv6 prefixes to one or more devices using messaging communicated from one or more of the ports.

10. The non-transitory computer-readable medium of claim 9 wherein the non-transitory instructions are sufficient for generating b according to the following equation:

$$b = \lceil \log_2(p+1) \rceil.$$

11. The non-transitory computer-readable medium of claim 10 wherein the non-transitory instructions are sufficient for generating c such that $c=2^b$ and the quantity of bits in each of the c binary bit combinations equals b.

12. The non-transitory computer-readable medium of claim 9 wherein the non-transitory instructions are sufficient for requesting the first IPv6 prefix from the delegating router and delegating the one or more of the second IPv6 prefixes from the router to the one or more devices according to Dynamic Host Configuration Protocol (DHCP).

13. The non-transitory computer-readable medium of claim 9 wherein the non-transitory instructions are sufficient for:

when c=2, generating:
i) the binary bit combinations to correspond with: [0] and [1]; and
ii) the second IPv6 prefixes to correspond with: [the first IPv6 prefix plus one additional bit of 0] and [the first IPv6 prefix plus one additional bit of 1]; and when c=4, generating:
i) the binary bit combinations to correspond with: [0,0]; [0,1]; [1,0]; [1,1]; and
ii) the second IPv6 prefixes to correspond with: [the first IPv6 prefix plus two additional bits of 0,0]; [the first IPv6 prefix plus two additional bits of 0,1]; [the first IPv6 prefix plus two additional bits of 1, 0]; and [the first Ipv6 prefix plus two additional bits of 1,1].

14. The non-transitory computer-readable medium of claim 9 wherein the non-transitory instructions are sufficient for:

receiving the first Ipv6 prefix as a /56 prefix; and
generating the second Ipv6 prefixes as four unique /58 prefixes when c=4.

* * * * *